US009699621B1

(12) United States Patent
Jarrett

(10) Patent No.: US 9,699,621 B1
(45) Date of Patent: Jul. 4, 2017

(54) SYSTEM FOR TRACKING, ASSIGNING, AND DISPOSING PERSONNEL AND ASSETS ON AN EMERGENCY SCENE

(71) Applicant: RESPONDERX, INC, Bryan, TX (US)

(72) Inventor: David Andrew Jarrett, College Station, TX (US)

(73) Assignee: ResponderX, Inc., Bryan, TX (US)

( * ) Notice: Subject to any disclaimer, the term of this patent is extended or adjusted under 35 U.S.C. 154(b) by 0 days.

(21) Appl. No.: 15/082,107

(22) Filed: Mar. 28, 2016

(51) Int. Cl.
H04M 11/04 (2006.01)
H04W 4/04 (2009.01)
H04W 4/00 (2009.01)
H04W 76/02 (2009.01)
H04W 76/00 (2009.01)
H04W 4/02 (2009.01)
H04L 29/08 (2006.01)
H04L 29/06 (2006.01)

(52) U.S. Cl.
CPC .......... *H04W 4/04* (2013.01); *H04L 63/0428* (2013.01); *H04L 67/10* (2013.01); *H04W 4/008* (2013.01); *H04W 4/021* (2013.01); *H04W 76/007* (2013.01); *H04W 76/023* (2013.01)

(58) Field of Classification Search
CPC ..... H04W 64/00; H04W 76/007; H04W 4/22; B60R 16/0315
USPC ................ 455/404.1, 404.2, 456.1; 340/3.01
See application file for complete search history.

(56) References Cited

U.S. PATENT DOCUMENTS

| 2006/0206246 | A1* | 9/2006 | Walker | G06Q 10/00 701/16 |
| 2011/0130636 | A1* | 6/2011 | Daniel | G08B 25/016 600/301 |
| 2014/0316841 | A1* | 10/2014 | Kilby | G06Q 10/06316 705/7.26 |
| 2014/0324326 | A1* | 10/2014 | Taylor | G08G 1/08 701/117 |
| 2015/0219461 | A1* | 8/2015 | Yang | G01S 5/0252 702/5 |
| 2016/0196735 | A1* | 7/2016 | Clayman | G08B 25/016 340/573.1 |

* cited by examiner

Primary Examiner — Danh Le
(74) Attorney, Agent, or Firm — Joseph E. Root

(57) ABSTRACT

An integrated hardware and software system for locating, disposing, and directing resources and personnel on an emergency scene. Such a system includes a set of wearable tags, each an accelerometer, a gyroscope, or a magnetometer; and a transmitter. Hubs, paired with tags, receive and process data. Servers receive the data, and a Simultaneous Locating and Mapping Module processes it to compile a map of at least a portion of the emergency scene. A command device, adapted to receive input from the servers can be provided to process the server input and to provide communications to emergency scene personnel, to control elements having emergency scene responsibility, and storing data in a data repository. A specialized tag can include a ranging unit (radar, etc.), and data from that tag can be used to create a map of the emergency scene, showing room features and responder locations.

19 Claims, 6 Drawing Sheets

US 9,699,621 B1

SYSTEM FOR TRACKING, ASSIGNING, AND DISPOSING PERSONNEL AND ASSETS ON AN EMERGENCY SCENE

TECHNICAL FIELD

Broadly, the presently disclosure sets out embodiments that relate to communication, command, and control systems employed by first responders and similar organizations.

BACKGROUND

Emergency scenes, involving firefighters, police, EMS and similar organizations, are characterized by chaos and confusion, yet they require split-second judgment. Also, as one considers increasingly larger and more complex emergency situations—going, for example, from a single-family dwelling fire to a factory or warehouse conflagration—the challenge escalates exponentially. Adding responder organizations further complicates the problem, as issues of chain of command, operational procedures, and equipment interoperability arise. Without prior thought and organization, added resources can exacerbate the emergency rather than solving it.

Responder safety issues often stem from the simple fact that emergency scenes by their very nature prevent leaders and managers from knowing exactly where their responders are located. Knowing the particular environment where a responder team is working, including the ambient temperature, would enhance a commander's ability to safeguard the unit. Tracking his firefighters within a burning building, for example, would permit a commander to direct the unit with precision, and he would also be able to guide assistance precisely to their location if trouble arises.

At the highest levels, the US Department of Homeland Security, working through its Federal Emergency Management Agency (FEMA), has instituted a National Incident Management System to deal with the most serious threats, such a major disaster or terrorist attack. That System includes an Incident Command System (ICS) that defines roles and responsibilities to deal with these situations. Plainly, however, incidents vary in seriousness from limited situations, such as a single-building fire or localized disturbance, to a problem meriting national attention.

Thus, there remains a need for a comprehensive solution that will allow responders to organize, coordinate, and execute an effective response to emergency situations at a local level.

SUMMARY

One aspect of the present disclosure is an integrated hardware and software system for locating, disposing, and directing resources and personnel on an emergency scene. A first component of such a system is a set of tags, at least one tag being attached to each responder on the emergency scene. Each tag can include a battery; one or more sensors, including a ranging device, an accelerometer, a gyroscope, or a magnetometer; a transmitter; and a tag control system, adapted to receive data from the battery and sensors, to process the received data, and to transmit data. Additionally, the system can also include one or more hubs, adapted to establish and operate a communications network including tags, each hub further adapted to receive data from tags, to process the received data, and to communicate the data and any results of the processing. Further, a group of servers is provided, each server in communication with one or more hubs. These servers can include a Simultaneous Locating and Mapping Module, configured to process communications from one or more hubs for compiling a map of at least a portion of the emergency scene. A command device, adapted to receive input from the servers can be provided to process the server input and to provide communications to emergency scene personnel, to control elements having emergency scene responsibility, and storing data in a data repository.

The tags set out above could include an Accountability Tag (AT) and a Room Mapping Tag (RMT). The AT could include a battery; one or more sensors, including one or more of, an accelerometer, a gyroscope, or a magnetometer; a transmitter; and a tag control system, adapted to receive data from the battery and sensors, to process the received data, and to transmit data. The RMT could include a battery; a ranging device; one or more sensors, including one or more of, an accelerometer, a gyroscope, or a magnetometer; a transmitter; and a tag control system, adapted to receive data from the battery, the radar and sensors, to process the received data, and to transmit data. The hubs can cooperatively process the received data to triangulate the location of each tag.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

Overview

Broadly, the present disclosure relates to a system for managing an emergency scene. The types of emergencies that can be addressed is very wide, so that the system will be useful for firefighters, police (at all levels), EMS, military, and any other first responders. For catastrophic events that merit attention at the highest levels, the FEMA Incident Command System (ICS) provides systems and structures for assisting those involved. The present disclosure is aimed at the levels below such catastrophes, where the prior art offers no solution. Examples of situations where the present disclosure might well be deployed include large structure, or multi-structure fires, domestic disturbances, hostage situations, hazardous materials incidents, wildfires, or vehicle accidents.

In general, the present disclosure allows an Incident Commander (IC) and Safety Officer, as defined in the FEMA ICS, to track the location of all responders at an emergency scene, to assign responders to particular tasks, and to coordinate the actions of teams within the overall emergency response. Additionally, the system allows the IC to monitor and deploy available assets. The system's flexibility allows for the addition and subtraction of personnel, teams, and assets seamlessly, providing the IC a continuously accurate view of the situation.

For the Safety Officer, the system provides detailed information about each responder, including location and ambient environment. Because information from each responder is processed and displayed centrally, the Safety Officer can identify trouble spots and steer teams away from them. When individual responders encounter extreme danger, the Safety Officer can immediately dispatch help, having knowledge of the responder's exact location and environmental factors. For example can track exactly when a responder enters or exits a building, or when he has entered a "rehab" station for evaluation by medics after having spent time inside a structure.

Exemplary Embodiments

Figure 1:
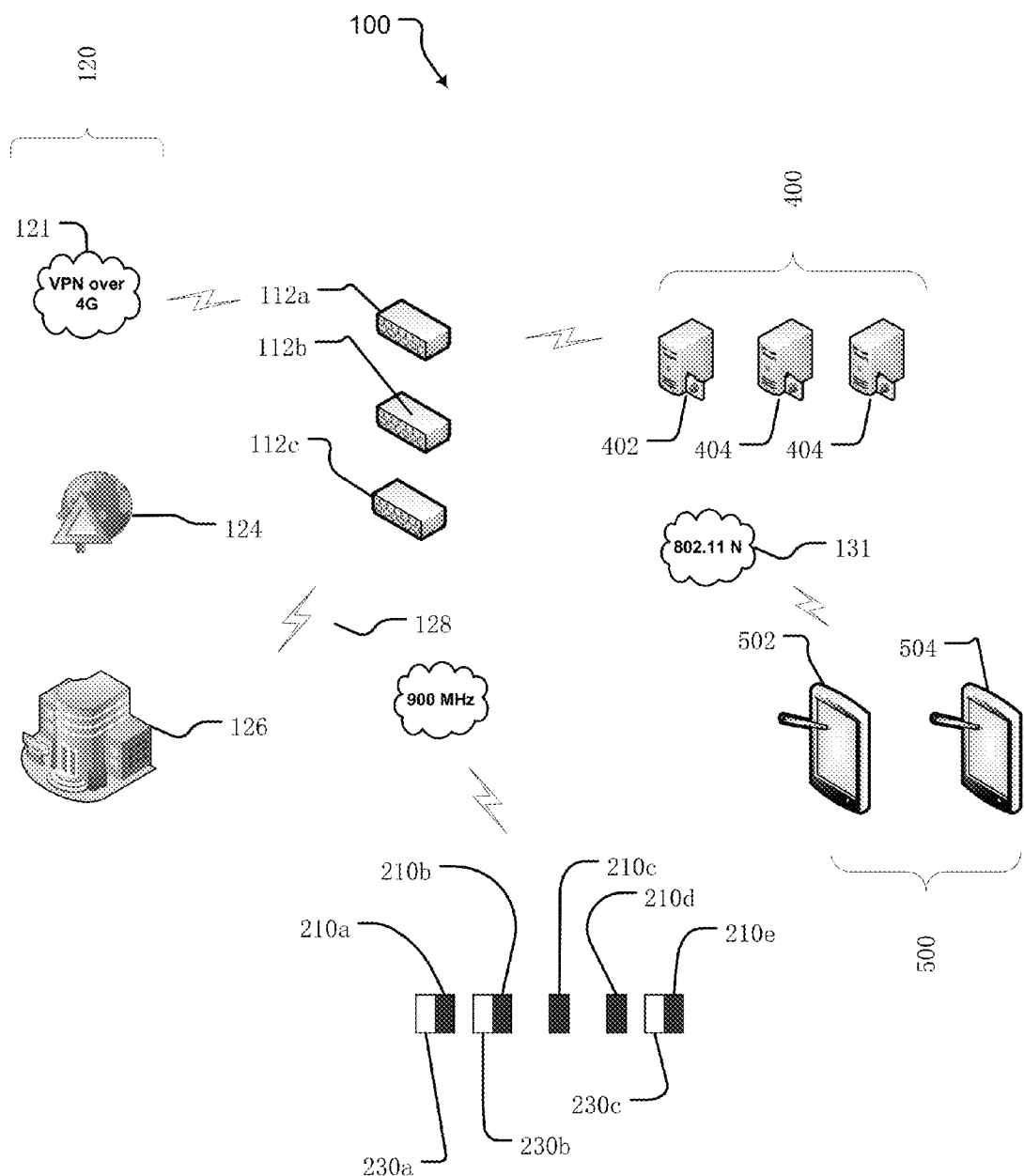
FIG. 1 illustrates the system of the present disclosure, deployed at an emergency scene.

FIG. 1 depicts a system 100 for managing an emergency scene. The system as a whole will be described, followed by detailed consideration of each component.

System 100 generally includes four groups of components. A first group consists of communication and wearable units, accountability tags 210, carried by each responder, as well as further wearable units, room mapping tags 230 carried by certain responders, as set out in detail below. In the example shown, five responders are equipped with accountability tags 210a-210e, while only three of those responders are also equipped with room mapping tags 230a—230c. Data from those units is received and processed by a second group, hubs 112, each of which is paired with a set of responder units. Hubs 112 communicate with servers 150, which perform data processing and communication functions. In addition to the responder/hub groups are two control groups, consisting first of a command group 130, including the IC and Safety Officer, together with command elements for sub-groups as needed. If both police and firefighters were participating in a given response, for example, the command group could include ranking police and fire department command elements. In addition, a management group 120 includes higher level personnel at the agency or political level. The last group will fluctuate with the nature of the emergency, and it may change composition as the situation itself evolves.

At the most basic level, each responder at the scene carries an accountability tag (AT) 210 attached to his outer garment or protective equipment. In FIG. 1, five AT's, 210a-210e are shown for illustrative purposes. The number of AT's will vary with each particular emergency scene, of course. In general, AT's continuously transmit information about their location and environment, as well as other information.

Figure 2A:
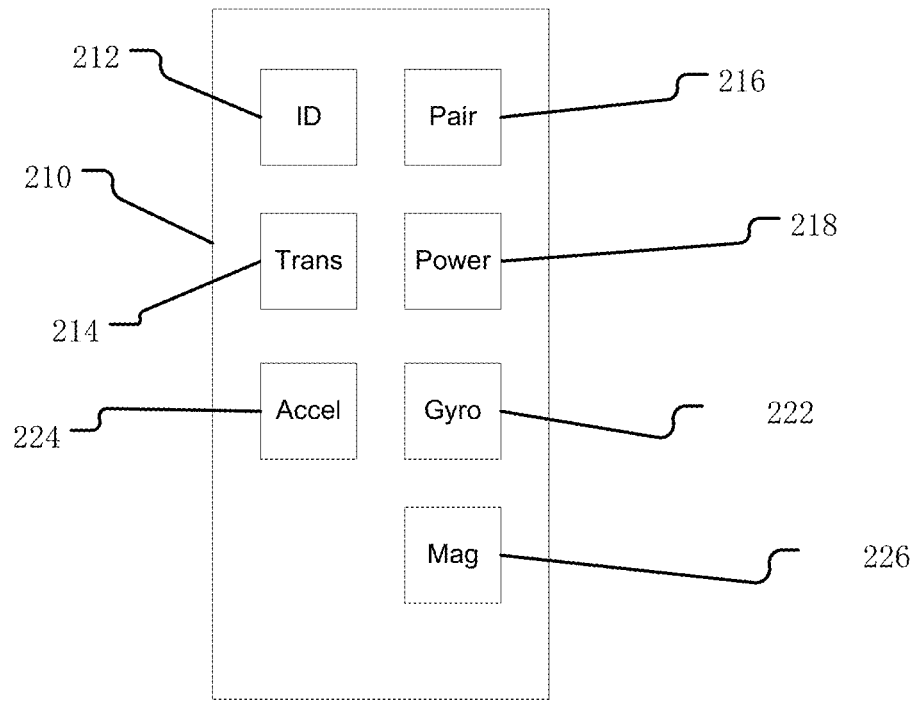
FIG. 2a is a block diagram of an Accountability Tag (AT)
Figure 2B:
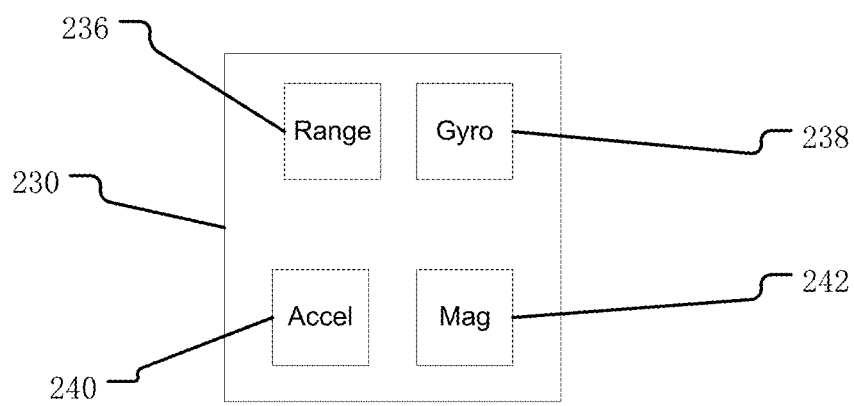
FIG. 2b is a block diagram of a Room Mapping Tag (RMT), both according to the present disclosure.

FIG. 2a illustrates the functional blocks contained in AT 210. In general, an AT 210 is a relatively small device, sized to be carried on the exterior of a responder's outer clothing or gear. Thus, it must be lightweight (not over 1 lb), shock resistant (should meet or exceed Ingress Protection IP678, and withstand the shock of a 10 ft. drop), and include a secure attachment mechanism. Given the nature of emergency environments, the AT must also be able to withstand radiant heat up to 250° C. In addition, AT 210 may be classified as "intrinsically safe" if able to operate in the vicinity of explosive devices without setting them off with RF energy, and is able to operate in an environment including inflammable vapors or gases without providing any ignition energy, such as a spark. These devices provide services that can generally be grouped as support and communications functionality.

A number of modules embedded in the AT provide continuous information about the wearer's position and environment. ID module 212 transmits a unique identifier, enabling a signal to be associated immediately with a given responder. Pairing module 216 automatically pairs with hubs in range. Multiple hubs will work together to provide triangulation, as discussed below. so tags will maintain connectivity with each hub in range, and those hubs will reconcile information among themselves. A channel switching algorithm handles traffic when a single channel within the band is saturated.

Communications capability is provided by transceiver module 214. The preferred technology for this device is sub-GHz wireless, as discussed more fully below. At a minimum, an AT must be able to communicate at a range of at least 100 m inside a building, or 1000 m line of sight outside. Communication protocols can be chosen from among a variety of techniques available to those in the art.

Power module 218 controls the AT power supply. It will be understood first that an AT 210 operates in an "always on" state, and thus battery power is critical to its operation. The choice of a particular battery to be used in an embodiment of AT 210 can be left to those of skill in the art, understanding that a battery life of at least two weeks in a low-power state, or 12 hours in an active power state, is required. The battery can be either an easily replaceable single-use battery, or a fast charging non-replaceable battery, in either case using appropriate technology. Power module 218 monitors the battery charge level and controls the recharging process where applicable. It transmits that information periodically to its paired hub, if one exists. This module also can control switching between a low-power state, when no hub is nearby or when so configured. It can automatically switch to an "activated" state upon receiving a command to do so.

An important functionality of the AT 210 is the ability to provide continuous information about the location and status of the associated responder. Those functions are performed a sensor array. It will be understood that specific sensors included in this array can vary based on the expected emergency missions to be performed, available technology, and budgetary considerations. The specific sensors discussed below are provided as an example of the types of sensors that can be provided, given the technology available at the time this patent application is filed.

Gyroscope 222 and accelerometer 224 can combine to provide information about the responder's movement and orientation. That information, plus triangulating the AT signal by multiple hubs 112, can be used to pinpoint the location of each responder, as described more fully below. This process provides higher resolution than is possible with a GPS receiver by itself, providing sufficient resolution to track small movements, such as ascending a flight of stairs. Additionally, these devices can provide information concerning the wearer's orientation. That factor can be a highly significant indicator, showing, for example, that the responder has fallen down, has stopped moving, or is in an unusual body position. Similarly, magnetometer 226 is particularly useful for indicating proximity to steel structures, such as structural members of a large building, or metal doors.

In addition to the AT, certain responders may be equipped with a Room Mapping Tag (RMT) 230. This device provides data that allows site management personnel not only to track responders, but also to construct 3-D maps of the area traversed by responders, accurately locating walls, stairs, and other features inside a building or structure, features that could be critical to the safety of responders inside. Each RMT includes an array of sensors that provide input to mapping devices, including a ranging device 236, a gyro 238, an accelerometer 240, and a magnetometer 242. The ranging device 236 can be implemented by any of a number of technologies that indicates solid services in the vicinity of the wearing responder, such as walls, pillars, and the like. Radar and ultrasound are available technologies in this area, as is laser technology in some applications. In addition to the ranging device 236, gyroscope 238 and accelerometer 240, identical to the similar units in the AT, are including in the RMT.

The second group of system components consists of one or more hubs 112, shown generally in FIG. 1. Each hub is an interfaceless computer—that is, the computer is not configured to display output to a human user, on an integral screen or an external monitor, nor is it configured to interact with a human user at all. Rather, hubs 112 serve as wireless access points for servers 400. Hubs 112 pass data to other devices, which process it appropriately and display information needed for reporting and decision-making on appropriate devices. Hubs are usually permanently mounted in a vehicle associated with a responder team, and that hub is paired with the AT's and RMT's of the team members.

Figure 3:
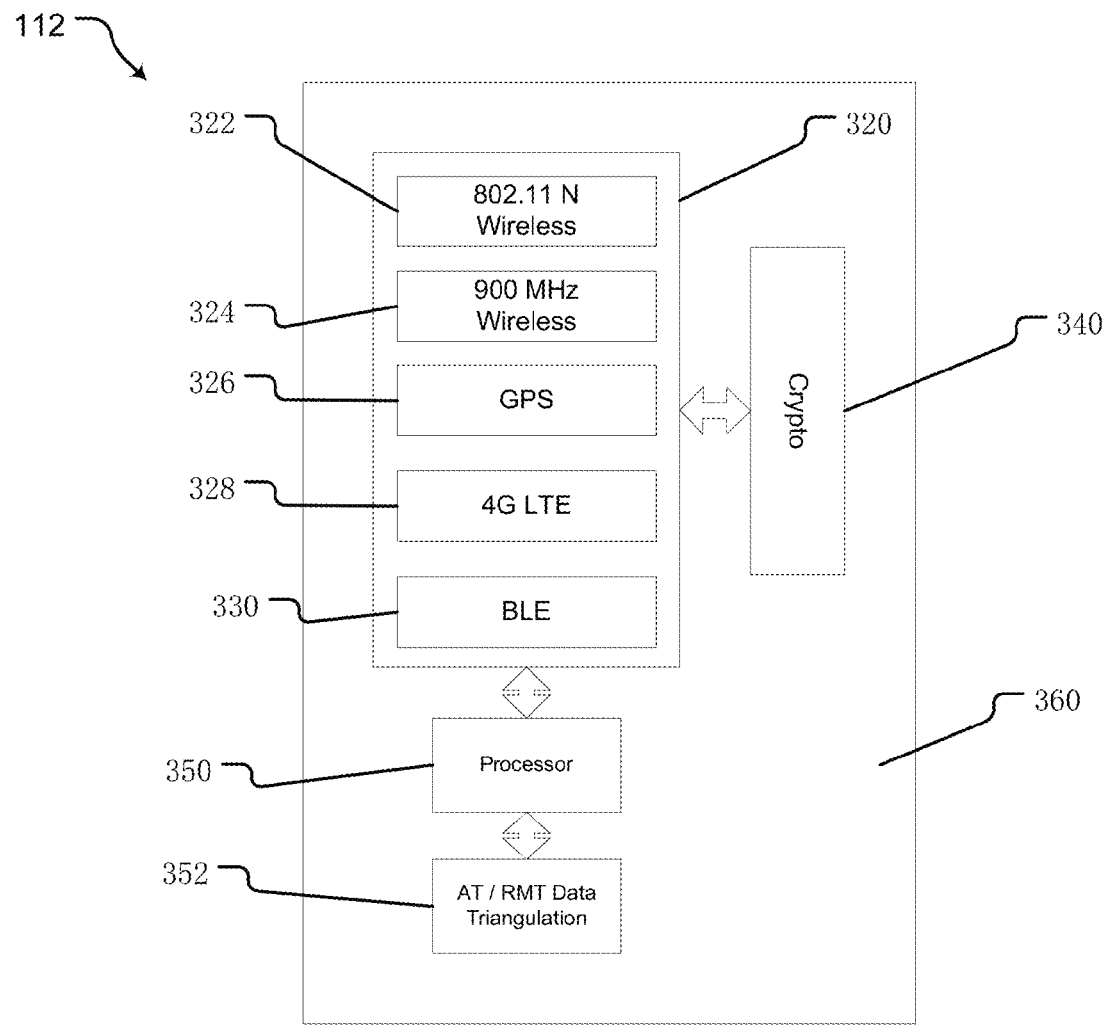
FIG. 3 depicts a hub according to the present disclosure.

FIG. 3 is a block diagram of a hub 112. A communications module 320 includes a number of separate communications channels and modes, permitting continuous communication with the various personnel and equipment at an incident scene. In an exemplary embodiment, separate communication modules can include an 802.11 N wireless module 322, used primarily to communicate with tablets 502, 504; a 900 MHz radio module 324, for communicating among the hubs 112; a GPS module 326 for receiving and transmitting position information; a 4G LTE module 328 for communicating with administrative, control, and support activities 126 (FIG. 1) via VPN over 4G network 121. A Bluetooth BLE capability is also provided in BLE module 330.

It should be noted that communication with RMT's 230 is managed identically to communication with AT's 210. Therefore, for simplicity of text, communication activities ascribed below to AT's should be understood as applying equally to RMT's From an overall view, it is important to understand that each hub receives information from paired AT's and RMT's. Here, "paired" means that the system configuration establishes a hierarchical relationship between a hub 112 and a group of AT's 210 and RMT's 230. Paired wearable units send data only to their paired hub, and in turn the hub does not seek to manage any units except those designated to pair with it.

As with the AT's, the number of hubs at a specific emergency scene will depend on the number of responders. Because hubs 112 are paired with AT's and RMT's, multiple hubs 112 are generally required.

Hub communications module 320 provides communications interconnectivity among the various elements of the system. It will be understood that those of skill in the art will configure communications devices and means to fit expected situations. Further, technology will evolve over time, offering communications means and equipment not envisioned as this application is written, which also rendering obsolete many of the specific equipment described here. It is expected that future system configurations will adapt to such changes, and that those of skill in the art will make the alterations required.

Communications security is a highly important factor, because even non-malicious interference with communications would endanger the response. Hacking or other attacks could go further, multiplying the effect of the original emergency. Thus, it is preferred that all hub communications channels be structured as encrypted tunnels, following protocols such as secure shell (SSH) or similar protocols. Those of skill in the art will understand the procedures required for that technology, and for technology to be developed and implemented hereafter.

A difficult aspect of communications security is simply determining what devices properly have access to the communications network. Often, responder units will be added on the fly. Organizations will maintain an up-to-date configuration for all organic and attached units, so that all elements arriving at an incident scene can communicate under established security protocols. Those of skill in the art understand and already employ protocols that allow appropriate personnel to add newly-employed units at an incident scene. Software to accomplish, or aid in accomplishing that task is within the knowledge of those of skill in the art.

The importance of data security was noted above, with the solution of providing encrypted tunnels for communication with the command and administrative groups. The actual encryption is performed by crypto module 340, which receives both outgoing and incoming communication for either encryption or decryption. It will be appreciated that a number of encryption solutions are available to system designers, who will be able to select suitable hardware and software for specific situations. For example, encryption functionality could be built in to various components, rather than requiring a separate component.

A processor module 350 performs signal processing operations as required.

A key function of each hub 112 is tracking the location of each of its paired AT's/RMT's. That operation is performed at AT/RMT data module 352. Because the precise location of every hub (and thus the vehicles on which it is mounted) can be ascertained by its on-board GPS receiver, and because multiple hubs can receive signals from a given AT/RMT, the relative position of that AT/RMT can be determined by triangulation, and its precise location can then be calculated employing the hub GPS data. This functionality is combined with the further calculations at a server 400, detailed below.

Hubs 112 are physically tied to servers 400 (FIG. 1). Servers generally function in two areas. First, servers are able to perform more robust processing operations than can be handled at the hubs 112. Second, the output of those processing operations can be prepared for presentation to human users, as well as stored for future use.

Figure 4:
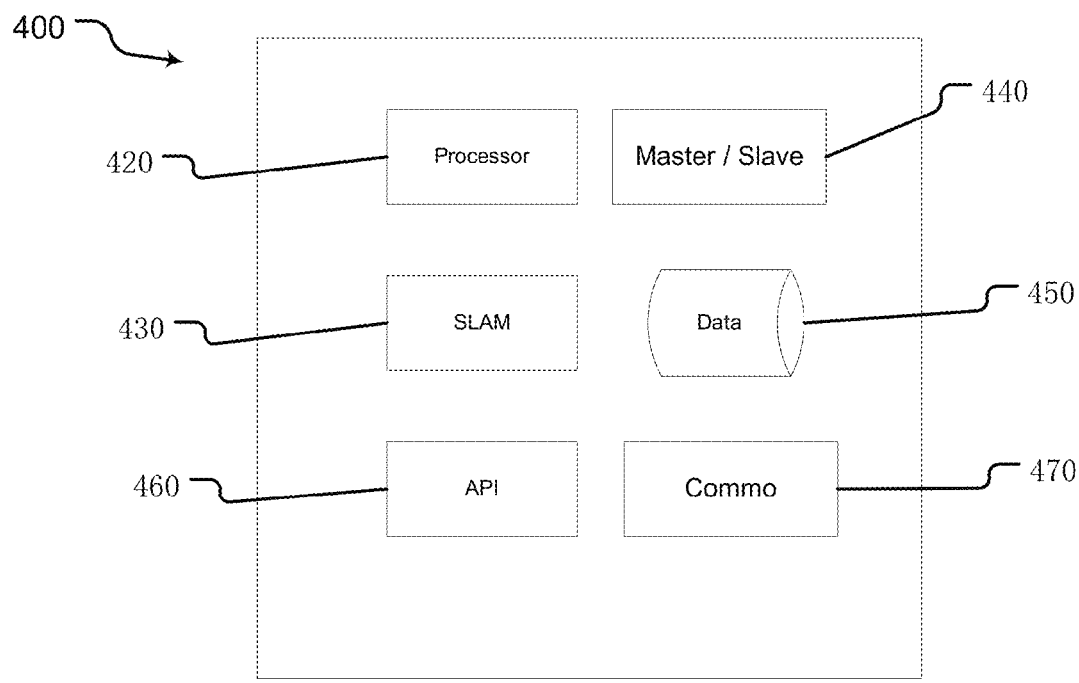
FIG. 4 is a block diagram of an embodiment of a server according to the present disclosure.

A server 400 may include the components shown in the block diagram of FIG. 4. There a processor 420 provides computing power greater than that available at the hubs 112. Positioning this device at the server 400 not only enables the use of a more capable chip, but it also permits the employment of additional peripheral devices, such as RAM and the like.

A particular type of processing is done by the Simultaneous Locating and Mapping (SLAM) module 430. It was noted above that the ability to locate and track individual responders is important both to safety and to effective execution of the mission. The SLAM module accepts inputs from each AT/RMT paired with a hub 112, together with the triangulated location data for that AT/RMT generated by the hub 112. It combines that data with data from an RMT's ranging module 236 and AT/RMT's gyroscope 238, its accelerometer 240, and its magnetometer 242. The SLAM module 380 combines data from all paired AT's to assemble a real-time 3-D map of the group's responders. Moreover, data from the ranging modules 236 and magnetometer 242 can be processed to obtain information about walls, ceilings, obstacles and other environmental factors affecting performance and safety. Additionally, the SLAM module can monitor tag data to note the location and orientation of each responder. That data can further be monitored to trigger an alarm if a responder does not move within a given time period, or when a body orientation indicates a potential problem. In that manner, the system can identify potential safety issues or injuries and vector assistance in real time.

Where multiple servers are provided, as is normal in an incident of any size, servers can be configured to name one server as the master server 402, all other servers being designated "slave" servers 404 (FIG. 1). To provide that functionality, server operating software, at Master/Slave module 440 will "elect" a single server to act as the master server 402 to resolve inter-server conflicts and sync data up to the cloud via 4G channel 121. If the servers 404 on scene are unable to reach the master 402 for a given amount of time they will elect a new master server 402. This operation proceeds automatically and is verified at certain intervals to ensure that if an apparatus leaves the scene it doesn't take down the system.

Data storage module 450 provides a location for storing any of the various sorts of data handled by the system. Retaining raw data from each AT/RMT would allow reviewers to reconstruct the exact actions that occurred over the course of an incident, for example.

A server 402/404 would also provide a suitable location for hosting the system API. That program could take the form of a client/server program, allowing a thin client to run on mobile devices or tablets as well as distributed computing devices.

Communications module 470 oversees communication processes over a number of devices. If the server is the Master Server 402, the supervisory function may extend to the entire incident environment. Otherwise, this module will manage communications for several hubs and similar devices.

One possible configuration for incident communications is shown in FIG. 1, employing equipment and techniques available in 2015-16. As seen there, three different communications channels are employed, based on the needs in each instance. The first channel 102 provides communications between the AT's to their paired hubs. The preferred technology for this channel is sub-GHz wireless, offering extraordinary penetration through walls at low power, combining superior performance while maximizing battery life. This module also employs technology to dynamically change the power level in a range from 10 mW to 1W, depending on need, which further serves to reduce power consumption. Further communication between hubs 112 and AT's 110 may be provided via BLE, or Bluetooth 4.0. That channel is not suitable for operational communications, but it is useful for administrative tasks, such as checking battery life status and system status, as well pushing software updates to the AT's.

A second channel communicates between the hubs and the command group 130, and the preferred technology for that channel is wireless (WiFi) employing technology identified by IEEE standard 802.11N.

A third channel 121 provides communication between the hubs 112 and the management group 120. The technology of choice here is a virtual private network (VPN) configured on a 4G cellular system, preferably employing LTE technology. Data provided on this basis to management may be used to allow management to monitor ongoing progress. That capability will provide highly useful when multiple incidents are simultaneously in progress, as often happens in larger cities and similar jurisdictions.

Command and control for a given incident rests with an Incident Commander and a Safety Officer. Those persons exercise their command and control functions through tablet devices 502 and 504, respectively. These devices can be any of the devices commercially classed as "tablets," ranging from devices having relatively low-end computational power (such as the Apple iPad) to full tablet computers such as the Panasonic Toughpad or the Microsoft Surface Pro.

Figure 5:
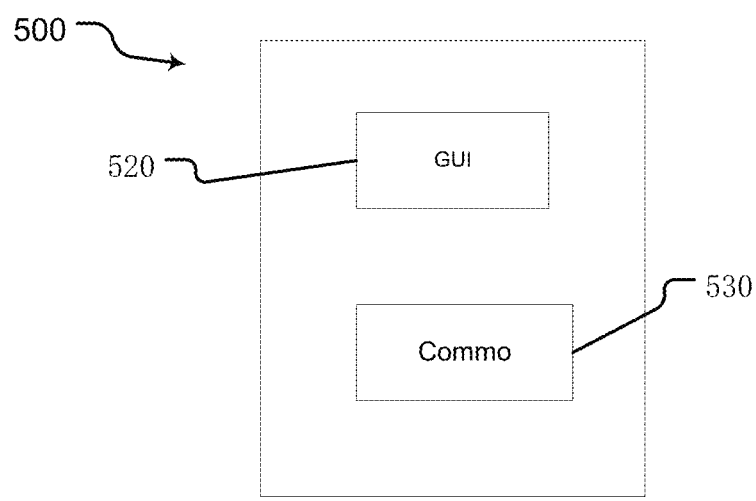
FIG. 5 is a block diagram of an embodiment of a tablet according to the present disclosure.

FIG. 5 is a functional block diagram of a tablet device 502/504. For the purposes of incident control, these devices incorporate two modules, a GUI 520, which interacts with the API running on a server 404, and a communications module 530. The latter module provides stable and reliable communications via 4G LTE with required devices.

Figure 6:
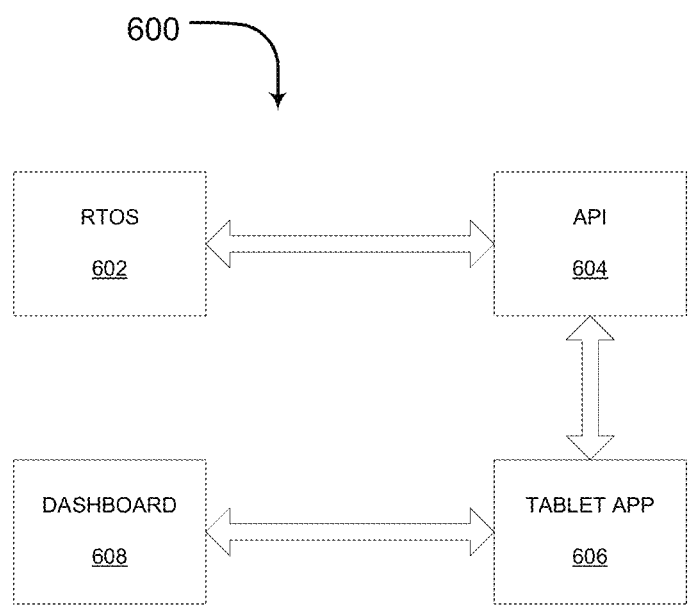
FIG. 6 is a block diagram of an embodiment of a software system adapted to support components of the present disclosure.

An embodiment of a software system 600 suitable for operating the present disclosure is shown in FIG. 6. There, a real-time operating system (RTOS) 602 is installed on the hubs 112, ATs 110 and RMT's 230. An API 604 operates on servers 150, receiving data from the ATs and RMT's via hubs 112 and processing that data as required. A tablet application 606 operates on tablets 132 and 134, receiving and displaying data that the tablets received from API 404. A cloud-based dashboard 608 in turn receives information from tablet application 406 and generates reports, such as after action reports, as well as providing live monitoring for management personnel. Also, routine software maintenance activities, such as software updates can be pushed down from the cloud, and a server 404 can distribute patches, upgrades, and the like to devices as required.

Tablets 502 and 504 do not communicate directly with the AT's, but rather they exchange information via the hubs 112, bringing together information from all hubs deployed at a scene. Where multiple hubs are present, the tablets communicate with the master server 402, as noted above.

The final group of system components is the management group 120. The personnel involved in this group most likely will be located remotely from any given set of responders. This group can be divided into support/administrative personnel, who access the system via hosted environment 122, and agency oversight portion 126, whose personnel access the system via a secure website. Communication with both subgroups can proceed through channel 121, employing a 4G VPN structure to the hosted environment 122. From there a traditional Internet channel 128 can be employed, employing Secure Socket Layer technology or the like.

Hosted environment 122 includes reporting and management tools. The former category of software includes dashboards providing overall management information, including report generation. Commercial Enterprise Resource Management software may be interfaced to the system to link personnel and supply management functions to the operational portion of the system. Reports and playback of various data captured during an incident can also be received via this means, and those items can be used for review and training.

The agency oversight portion 126 takes a more distant view, with access generally restricted to summary information. To the extent that more detailed views are required, for audits or the like, permissions can be granted for more detailed access.

The specification has described a system for tracking, assigning, and disposing personnel and assets on an emergency scene. Those of skill in the art will perceive a number of variations possible with the system and method set out above. These and other variations are possible within the scope of the claimed invention, which scope is defined solely by the claims set out below.

I claim:

1. An integrated hardware and software system for locating, disposing, and directing resources and personnel on an emergency scene, comprising:
one or more tags, at least one tag being attached to each responder on the emergency scene, each tag including
a battery;
one or more sensors, each sensor including one or more of a ranging device, an accelerometer, a gyroscope, or a magnetometer;
a transmitter; and
a tag control system, adapted to receive data from the battery and sensors, to process the received data, and to transmit data;
wherein the tags include an Accountability Tag (AT) and a Room Mapping Tag (RMT), the AT sensors further including one or more of, an accelerometer, a gyroscope, or a magnetometer; and
the RMT further including a ranging device and one or more of, an accelerometer, a gyroscope, or a magnetometer;
one or more hubs, adapted to establish and operate a communications network including tags, each hub further adapted to receive data from tags, to process the received data, and to communicate the data and any results of the processing, the hubs further cooperatively processing the received data to triangulate the location of each tag;
one or more servers, each server in communication with one or more hubs, including
a Simultaneous Locating and Mapping Module, configured to process communications from one or more hubs for compiling a map of at least a portion of the emergency scene, and
a command device, adapted to receive input from the servers, to process the server input, and to provide communications to emergency scene personnel, to control elements having emergency scene responsibility, and storing data in a data repository.

2. The system of claim 1, wherein the ranging device is a radar transceiver.

3. The system of claim 1, wherein the ranging device is an ultrasonic transceiver.

4. The system of claim 1, wherein the ranging device is a Lidar transceiver.

5. The system of claim 1, wherein each hub is paired with one or more tags.

6. The system of claim 1, wherein each hub is affixed to a responder vehicle or site.

7. The system of claim 1, wherein communication among tags and hubs and servers is encrypted.

8. The system of claim 1, wherein one server is configured as a master server, adapted to resolve conflicts among servers.

9. The system of claim 1, wherein each command device is a tablet computer.

10. The system of claim 1, wherein one command device is designated as functioning for an Incident Commander and one command device is designated as functioning for a Safety Officer.

11. The system of claim 1, further comprising one or more of a hosted environment or a secure website, in communication with the servers via a cloud, adapted for performing administrative and control functions.

12. An integrated hardware and software system for locating, disposing, and directing resources and personnel on an emergency scene, comprising:
one or more tags, at least one tag being attached to each responder on the emergency scene, the tags including an Accountability Tag (AT) and a Room Mapping Tag (RMT),
the AT including
a battery;
one or more sensors, including one or more of, an accelerometer, a gyroscope, or a magnetometer;
a transmitter; and
a tag control system, adapted to receive data from the battery and sensors, to process the received data, and to transmit data; and
the RMT including
a battery;
a transceiver, employing radar, lidar, or ultrasound technology;
one or more sensors, including one or more of, an accelerometer, a gyroscope, or a magnetometer;
a transmitter; and
a tag control system, adapted to receive data from the battery, the radar and sensors, to process the received data, and to transmit data; and
one or more hubs, adapted to establish and operate a communications network including tags, each hub further adapted to receive data from tags, to process the received data, and to communicate the data and any results of the processing, wherein processing the received data includes, cooperatively among one or more hubs, triangulating the location of each tag;
one or more servers, one server being configured as a master server, adapted to resolve conflicts among servers each server in communication with one or more hubs, each server including
a Simultaneous Locating and Mapping Module, configured to process communications from one or more hubs for compiling a map of at least a portion of the emergency scene, and further configured to monitor position and body orientation of responders and to trigger an alarm under specified conditions; and
one or more command devices, in the form of tablet computers, adapted to receive input from the servers, to process the server input, and to provide communications to emergency scene personnel, to control elements having emergency scene responsibility, and storing data in a data repository.

13. The system of claim 12, further comprising one or more of a hosted environment or a secure website, in communication with the servers via a cloud, adapted for performing administrative and control functions.

14. The system of claim 12, wherein one command device is designated as functioning for an Incident Commander and one command device is designated as functioning for a Safety Officer.

15. The system of claim 12, wherein each hub is affixed to a responder vehicle or site.

16. The system of claim 12, wherein communication among tags and hubs and servers is encrypted.

17. An integrated hardware and software system for locating, disposing, and directing resources and personnel on an emergency scene, comprising:
- one or more tags, at least one tag being attached to each responder on the emergency scene, the tags including an Accountability Tag (AT) and a Room Mapping Tag (RMT),
  - the AT including
    - a battery;
    - one or more sensors, including one or more of, an accelerometer, a gyroscope, or a magnetometer;
    - a transmitter; and
    - a tag control system, adapted to receive data from the battery and sensors, to process the received data, and to transmit data; and
  - the RMT including
    - a battery;
    - a transceiver, employing radar, lidar, or ultrasound technology;
    - one or more sensors, including one or more of, an accelerometer, a gyroscope, or a magnetometer;
    - a transmitter; and
    - a tag control system, adapted to receive data from the battery, the radar and sensors, to process the received data, and to transmit data; and
- one or more hubs, adapted to establish and operate a communications network including tags, each hub further paired with and adapted to receive data from one or more tags, to process the received data, and to communicate the data and any results of the processing, wherein processing the received data includes, cooperatively among one or more hubs, triangulating the location of each tag;
- one or more servers, one server being configured as a master server, adapted to resolve conflicts among servers each server in communication with one or more hubs, each server including
  - a Simultaneous Locating and Mapping Module, configured to process communications from one or more hubs for compiling a map of at least a portion of the emergency scene, and further configured to monitor position and body orientation of responders and to trigger an alarm under specified conditions;
- one or more command devices, in the form of tablet computers, adapted to receive input from the servers, to process the server input, and to provide communications to emergency scene personnel, to control elements having emergency scene responsibility, and storing data in a data repository; and
- one or more of a hosted environment or a secure website, in communication with the servers via a cloud, adapted for performing administrative and control functions.

18. The system of claim 17, wherein one command device is designated as functioning for an Incident Commander and one command device is designated as functioning for a Safety Officer.

19. The system of claim 17, wherein each hub is affixed to a responder vehicle or site.

* * * * *